US 9,504,047 B2

(12) United States Patent
Kim et al.

(10) Patent No.: US 9,504,047 B2
(45) Date of Patent: Nov. 22, 2016

(54) METHOD AND APPARATUS FOR OPPORTUNISTIC USER SCHEDULING OF TWO-CELL MULTIPLE USER MIMO

(75) Inventors: Ki-Il Kim, Gyeonggi-do (KR); Duck-Dong Hwang, Gyeonggi-do (KR); Clerckx Bruno, Seoul (KR); Tae-Joon Kim, Berkeley, CA (US); David J. Love, West Lafayette, IN (US)

(73) Assignees: Samsung Electronics Co., Ltd (KR); Purdue Research Foundation, West Lafayette, IN (US)

(*) Notice: Subject to any disclaimer, the term of this patent is extended or adjusted under 35 U.S.C. 154(b) by 20 days.

(21) Appl. No.: 13/608,538

(22) Filed: Sep. 10, 2012

(65) Prior Publication Data

US 2013/0336233 A1    Dec. 19, 2013

Related U.S. Application Data

(60) Provisional application No. 61/532,610, filed on Sep. 9, 2011.

(51) Int. Cl.
*H04W 72/08* (2009.01)
*H04B 7/04* (2006.01)
*H04B 7/06* (2006.01)

(52) U.S. Cl.
CPC ........ *H04W 72/082* (2013.01); *H04B 7/0452* (2013.01); *H04B 7/0617* (2013.01); *H04B 7/0606* (2013.01)

(58) Field of Classification Search
CPC .................................. H04W 72/082
USPC ............................. 370/329; 455/517
See application file for complete search history.

(56) References Cited

U.S. PATENT DOCUMENTS

| | | | |
|---|---|---|---|
| 7,907,911 B2* | 3/2011 | Alexiou et al. | 455/69 |
| 8,280,444 B1* | 10/2012 | Shen | H04B 7/024 455/561 |
| 8,542,640 B2* | 9/2013 | Ramprashad et al. | 370/329 |
| 2006/0233131 A1* | 10/2006 | Gore et al. | 370/328 |
| 2007/0049218 A1* | 3/2007 | Gorokhov et al. | 455/102 |
| 2008/0117867 A1* | 5/2008 | Yin et al. | 370/329 |
| 2008/0239938 A1* | 10/2008 | Jalloul et al. | 370/201 |
| 2009/0051592 A1* | 2/2009 | Lee | H04B 7/0408 342/368 |
| 2009/0238292 A1* | 9/2009 | Clerckx et al. | 375/260 |
| 2009/0245212 A1* | 10/2009 | Sambhwani et al. | 370/336 |
| 2010/0027456 A1* | 2/2010 | Onggosanusi et al. | 370/312 |

(Continued)

OTHER PUBLICATIONS

Catt, "Implicit Feedback in Support of Downlink CoMP", R1-094141, 3GPP TSG RAN WG1 Meeting #58bis, Oct. 12, 2009.

(Continued)

*Primary Examiner* — Parth Patel
(74) *Attorney, Agent, or Firm* — The Farrell Law Firm, P.C.

(57) ABSTRACT

An apparatus and a method for opportunistic user scheduling of two-cell multiple user Multiple Input Multiple Output (MIMO) by a base station, the method comprising: broadcasting signals through random beams to users; and receiving Channel Quality Information (CQI) from best K user set. The CQI is calculated based on all possible combinations of transmit beamforming vectors.

20 Claims, 5 Drawing Sheets

(56) References Cited

U.S. PATENT DOCUMENTS

| | | | |
|---|---|---|---|
| 2010/0034093 A1* | 2/2010 | Roh | H04B 7/0417 370/241 |
| 2010/0034114 A1* | 2/2010 | Kim et al. | 370/252 |
| 2010/0034146 A1* | 2/2010 | Hou et al. | 370/328 |
| 2010/0074316 A1* | 3/2010 | Kim | H04L 1/0026 375/228 |
| 2010/0130223 A1* | 5/2010 | Liao et al. | 455/453 |
| 2010/0151871 A1* | 6/2010 | Zhang | H04L 1/0002 455/450 |
| 2010/0273498 A1* | 10/2010 | Kim et al. | 455/450 |
| 2011/0039547 A1 | 2/2011 | van Rensburg et al. | |
| 2011/0051837 A1 | 3/2011 | Park et al. | |
| 2011/0065448 A1* | 3/2011 | Song et al. | 455/452.2 |
| 2011/0090945 A1* | 4/2011 | Yang et al. | 375/227 |
| 2011/0096810 A1* | 4/2011 | Suehiro et al. | 375/130 |
| 2011/0249656 A1* | 10/2011 | Cai et al. | 370/336 |
| 2012/0015680 A1* | 1/2012 | Yang et al. | 455/517 |
| 2012/0020316 A1* | 1/2012 | Dong et al. | 370/329 |
| 2012/0033625 A1* | 2/2012 | Nagata | H04L 5/0023 370/329 |
| 2012/0087332 A1* | 4/2012 | Kim et al. | 370/329 |
| 2012/0176947 A1* | 7/2012 | Xi et al. | 370/311 |
| 2012/0201319 A1* | 8/2012 | Asplund et al. | 375/267 |
| 2012/0257568 A1* | 10/2012 | Cai et al. | 370/328 |
| 2012/0275402 A1* | 11/2012 | Prasad et al. | 370/329 |
| 2013/0021925 A1* | 1/2013 | Yin et al. | 370/252 |
| 2013/0022021 A1* | 1/2013 | Wild et al. | 370/330 |
| 2013/0094604 A1* | 4/2013 | Mondal et al. | 375/295 |
| 2013/0155973 A1* | 6/2013 | Geirhofer et al. | 370/329 |
| 2013/0208681 A1* | 8/2013 | Gore et al. | 370/329 |
| 2013/0260779 A1* | 10/2013 | Sohn et al. | 455/452.1 |
| 2013/0324109 A1* | 12/2013 | Kim et al. | 455/422.1 |
| 2014/0024388 A1* | 1/2014 | Earnshaw et al. | 455/452.2 |

OTHER PUBLICATIONS

Alcatel-Lucent, "Discussion on Physical Layer Aspects LTE-Advanced Proposals", R1-082076, 3GPP TSG RAN WG1 Meeting #53, May 5, 2008.

David Gesbert et al., "Multi-Cell MIMO Cooperative Networks: A New Look at Interference", IEEE Journal on Selected Areas in Communications , Dec. 2010, 29 pages.

Samir M. Perlaza et al., "From Spectrum Pooling to Space Pooling: Opportunistic Interference Alignment in MIMO Cognitive Networks", IEEE Transactions on Signal Processing, vol. 58, No. 7, Jul. 2010, 14 pages.

Viveck R. Cadambe et al., "Interference Alignment and Degrees of Freedom of the K-User Interference Channel", IEEE Transactions on Information Theory, Aug. 2008, 17 pages.

Changho Suh et al., "Interference Alignment for Cellular Networks", Proc. of Allerton Conference on Communication, Control, and Computing, Sep. 2008, 8 pages.

Viveck R. Cadambe et al., "Interference Alignment and Degrees of Freedom of Wireless X Networks", IEEE Transactions on Information Theory, Sep. 2009, 25 pages.

Jatin Thukral et al., "Interference Alignment with Limited Feedback", Proc. IEEE Intl. Symposium on Information Theory, Jun. 2009, 5 pages.

Behrouz Khoshnevis et al., "Grassmannian Beamforming for MIMO Amplify-and-Forward Relaying", IEEE Journals on Sel. Areas in Communications, Aug. 2008, 11 pages.

Taejoon Kim et al., "Spatial Degrees of Freedom of the Multicell MIMO Multiple Access Channel", IEEE Global Communications, Aug. 6, 2011, 5 pages.

* cited by examiner

METHOD AND APPARATUS FOR OPPORTUNISTIC USER SCHEDULING OF TWO-CELL MULTIPLE USER MIMO

PRIORITY

This application claims priority under 35 U.S.C. §119(e) to U.S. Provisional Application No. 61/532,610, which was filed in the U.S. Patent and Trademark Office on Sep. 9, 2011, the entire content of which is incorporated herein by reference.

1. Field of the Invention

The present invention relates generally to two-cell multiple user Multiple Input Multiple Output (MIMO), and more particularly, to a method and an apparatus for opportunistic user scheduling of two-cell multiple user MIMO.

2. Background Art

Over the past few years, a significant amount of research has gone into making various techniques for enhancing spectrum reusability reality. The spatial diversity techniques such as MIMO wireless systems have been widely studied to improve the spectrum reusability. Recently, the scope of the spatial diversity is extended to MIMO network wireless systems including the interference network, relay network, and multicellular network. Network MIMO systems are now an emphasis of IMT-Advanced and beyond systems. In these networks, out-of-cell (or cross cell) interference is a major drawback. Network MIMO systems, when properly designed, could allow coordination between nodes that would increase the quality of service in an interference limited area. Before network MIMO can be deployed and used to its full potential, there are a large number of challenging issues. Many of these deal with joint processing between nodes (e.g., see the references in D. Gesbert, S. Hanly, H. Huang, S. Shamai, O. Simeone, and W. Yu, "Multi-cell MIMO cooperative networks: a new look at interference," *IEEE Jour. Select. Areas in Commun.*, vol. 28, no. 9, pp. 1380-1408, December 2010).

Interference alignment is transmitters/receivers joint processing that generates an overlap of signal spaces occupied by undesired interference at each receiver while keeping the desired signal spaces distinct (e.g., see the references in V. Cadambe and S. Jafar, "Interference alignment and degrees of freedom of the k-user interference channel," IEEE Trans. Info.Theory, vol 54, no. 8, pp. 3425-3441, August 2008. and C. Suh and D. Tse, "Interference Alignment for Cellular Networks," Proc. Of Allerton Conference on Communication, Control, and Computing, September 2008. and V. Cadambe and S. Jafar, "Interference alignment and the degrees of freedom of wirelessX networks," IEEE Trans. Info.Theory, vol 55, no. 9, pp. 3893-3908, September 2009.). However, the joint processing between transmitters and receivers for interference alignment requires full channel knowledge at all nodes, which is arguably unrealistic. Recent work on the limited feedback explores the scales of the required feedback bits with respect to the required throughput or SINR (e.g., see the references Thukral and H. Bolcskei, "Interference alignment with limited feedback," in Proc. IEEE Inrl. Symposium on Info. Theory, June, 2009. and B. Khoshnevis, W. Yu, and R. Adve, "Grassmannian beamforming for MIMO amplify-and-forward relaying," IEEE Journals on Sel. Areas in Commun., vol. 26, pp. 1397-1407, August 2008.). However, the amount of CSI feedback in (e.g., see the references in Thukral and H. Bolcskei, "Interference alignment with limited feedback," in Proc. IEEE Inrl. Symposium on Info. Theory, June, 2009. and B. Khoshnevis, W. Yu, and R. Adve, "Grassmannian beamforming for MIMO amplify-and-forward relaying," IEEE Journals on Sel. Areas in Commun., vol. 26, pp. 1397-1407, August 2008.) to ensure the required performance is excessive and only gives marginal performance improvement per additional feedback. In addition, the feedback scheme in (e.g., see the references in Thukral and H. Bolcskei, "Interference alignment with limited feedback," in Proc. IEEE Inrl. Symposium on Info. Theory, June, 2009. and B. Khoshnevis, W. Yu, and R. Adve, "Grassmannian beamforming for MIMO amplify-and-forward relaying," IEEE Journals on Sel. Areas in Commun., vol. 26, pp. 1397-1407, August 2008.) assumes huge information sharing between backhauls of the transmitter.

SUMMARY OF THE INVENTION

Accordingly, the present invention is designed to address at least the problems and/or disadvantages described above and to provide at least the advantages described below.

Accordingly, an aspect of the present invention is to provide a method for opportunistic user scheduling of two-cell multiple user MIMO.

In accordance with an aspect of the present invention, a method is provided for opportunistic user scheduling of two-cell multiple user MIMO by a base station, the method comprising: broadcasting signals through random beams to users; and receiving Channel Quality Information (CQI) from best K user set. The CQI is calculated based on all possible combinations of transmit beamforming vectors.

BRIEF DESCRIPTION OF THE DRAWINGS

The above and other aspects, features, and advantages of certain embodiments of the present invention will be more apparent from the following detailed description when taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

In this work, we investigate the opportunistic user scheduling in interfering multiuser MIMO network where J users are associated with each transmitter and the selected K users together with their transmitters construct a two-cell multiuser MIMO broadcast channel. Other than feeding back excessive amount of CSI to transmitter, we consider a scenario where each transmitter broadcasts random beams (known at both sides of the transmitter and receiver) to users and the user sends back its CQI to transmitter for the opportunistic user selection. Backhaul between transmitters to allow information sharing is not assumed. We present exhaustive user scheduling approach and opportunistic user alignment scheme based on the interference alignment approach in (e.g., see the references in T. Kim, D. Love, and B. Clerckx, "Spatial Degrees of Freedom of the Multicell MIMO MAC," submitted in *IEEE Global Communications*, April, 2011.). For the exhaustive user scheduling, random beams are the actual transmit beams, but in the opportunistic user alignment the random beams are not the actual transmit beams. It is rather used for selecting users and once the users are selected transmit beams are designed at the transmitter. For each case, we define efficient CQI measure to be fed back to transmitter for user scheduling and we also address the optimal design of the post processing matrix to minimize the interference (inter user interference+out-of-cell interference or out-of-cell interference) or to maximize the sumrate.

1. System Model

Figure 1:
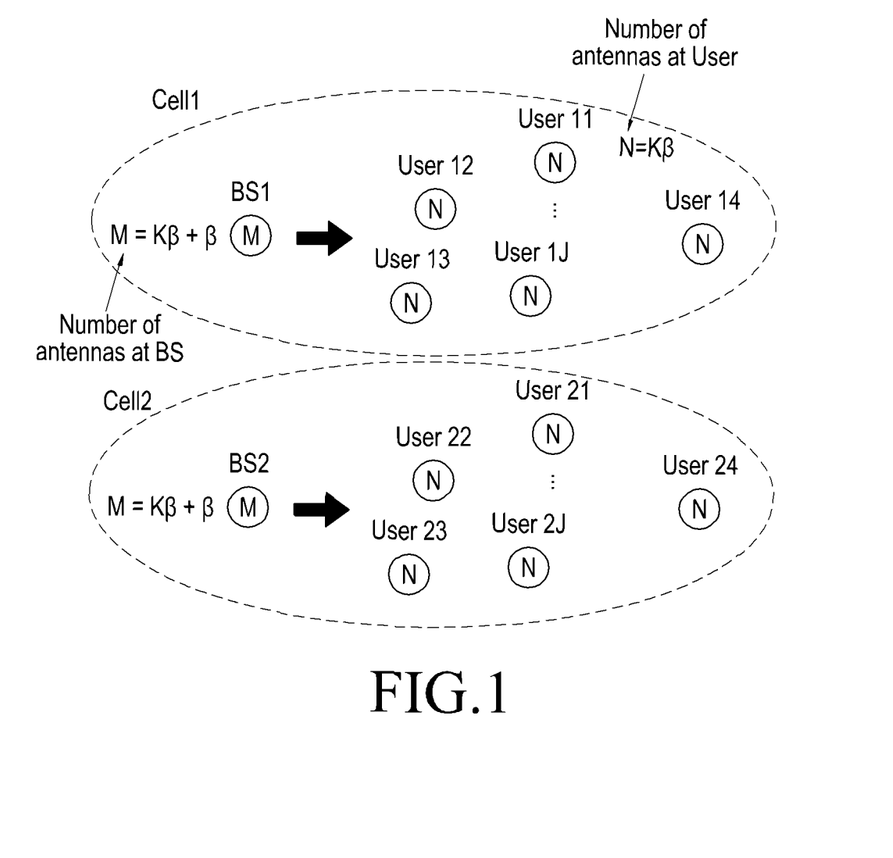
FIG. 1. illustrates system model choosing the best K user among j users on two-cell multiple user broadcasting channel.

FIG. 1. Illustrates system model choosing the best K user among j users on two-cell multiple user broadcasting channel.

Referring to FIG. 1, the base station has M antennas and each user is equipped with N antennas. There are total J users in the cell and only K users (K≤J) are selected and served by each BS. We use an index mj to denote the jth user in the cell m, where j∈J and J={1, ..., J}.

We use an index $m\pi_k$ to indicate kth scheduled user in cell m where $k \in \Pi = \{\pi_1, \ldots, \pi_K\} \subset J$.

We assume that each user has N=Kβ antennas and each base station is equipped with M=Kβ+β antennas. The base station sends Kβ streams to provide β streams to each of K users in the cell. The transmitter has no access for the perfect channel state information (CSI) at users, rather it has partial CSI for scheduling users. CSI sharing among base stations through backhaul is not allowed and only partial CSI from serving users is available at the base station.

In the first step, the base station m broadcasts signals through K random beams $\{V_{mi}\}_{i \in K}$, K={1, ..., K}, to users where $V_{mi} \in C^{(K\beta+\beta) \times \beta}$ and $V^*_{mi} V_{mi} = I_\beta$. Then, the received signal at jth user in the cell m can be determined as shown in Equation (1).

$$Y_{mj} = H_{mj,m} s_m + H_{mj,\overline{m}} s_{\overline{m}} + z_{mj} \quad (1)$$

In Equation (1), $\overline{m}$ is defined as $\overline{m} = \{1,2\} \backslash m$. The $H_{mj,m} \in C^{N \times M}$ denotes the channel matrix from the base station m to user mj. We assume the realizations of the channels $\{H_{mj,m}\}_{m \in \{1,2\}, j \in J}$ are mutually independent and each entries of $H_{mj,m}$ has independent and identical continuous distribution. The transmit signal from the base station m can be determined as shown in Equation (2).

$$s_m = \sum_{i=1}^{K} V_{mi} x_{mi} \quad (2)$$

Further, transmit power is constrained $tr(E[s_m s^*_m]) \leq P$, which can be written as $$tr(E[s_m s^*_m]) = tr\left( \sum_{i=1}^{K} V_{mi} E[x_{mi} x^*_{mi}] V^*_{mi} \right) \leq P.$$

We assume equal power transmission for each user and to meet the power constraint we assume $$E[x_{mi} x^*_{mi}] = \frac{P}{K\beta}.$$

Now, plugging Equation (2) into Equation (1) returns to Equation (3).

$$Y_{mj} = \sum_{i=1}^{K} H_{mj,m} V_{mi} x_{mi} + \sum_{i=1}^{K} H_{mj,\overline{m}} V_{\overline{m}i} x_{\overline{m}i} + z_{mj}. \quad (3)$$

To enable the user scheduling at the base station, each user measures channel quality information based on its own channel $H_{mj,m}$, out-of-cell interference channel $H_{mj,\overline{m}}$, and random beams $\{V_{mi}\}_{i \in K}$ where the transmitter and receiver share the same random beam generation method.

Figure 2:
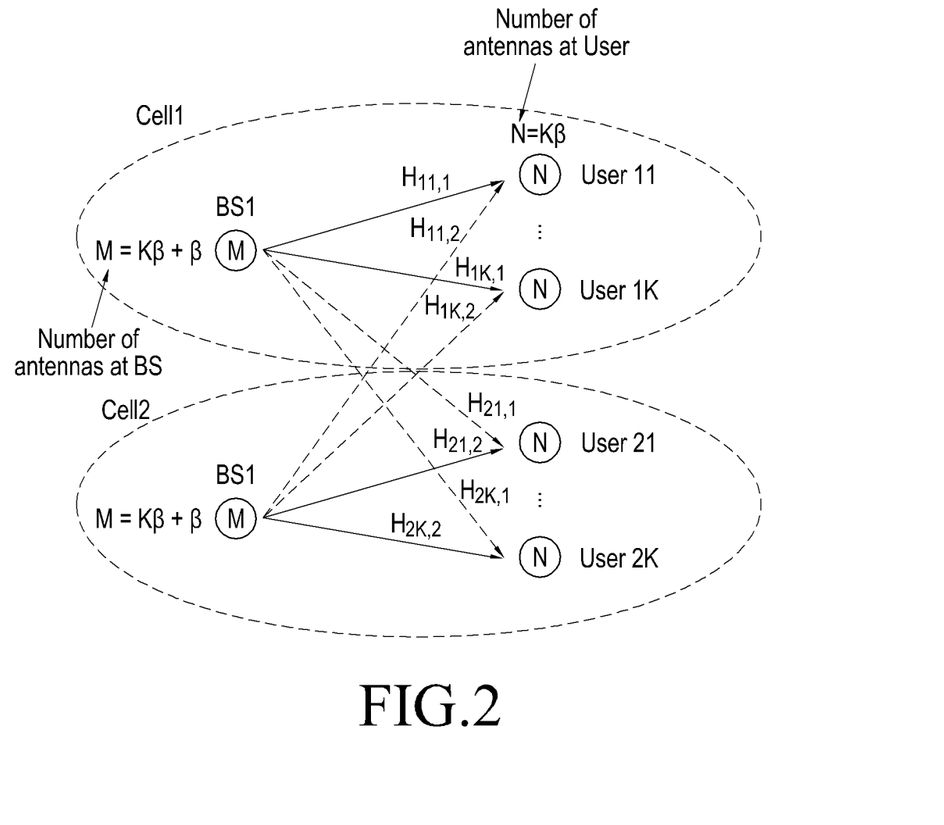
FIG. 2 illustrates system model when the best K users $\Pi=\{\pi_1, \ldots, \pi_K\}$ are scheduled in each of cells.

FIG. 2 Illustrates system model when the best K users $\Pi = \{\pi_1, \ldots, \pi_K\}$ are scheduled in each of cells.

Referring to FIG. 2, for Instance, the scheduled user index is given by {11, ..., 1k} and {21, ..., 2k}.

2. Exhaustive User Searching

User mj calculates Channel Quality Information (CQI) for all the possible combinations of transmit beamforming vectors $\{V_{mi}\}_{i \in K}$. Prior to define CQIs for exhaustive user scheduling, first several quantities are defined below.

$$SIG_{mj,i} = E[(H_{mj,m} V_{mi} x_{mi})(H_{mj,m} V_{mi} x_{mi})^*] = \frac{P}{K\beta} H_{mj,m} V_{mi} V^*_{mi} H^*_{mj,m}$$

$$INT_{IU,mj,K \backslash i} =$$

$$E\left[ \left( \sum_{l \neq i}^{K} H_{mj,m} V_{ml} x_{ml} \right) \left( \sum_{l \neq i}^{K} H_{mj,m} V_{ml} x_{m1} \right)^* \right] = \frac{P}{K\beta} H_{mj,m} \sum_{l \neq k}^{K} V_{ml} V^*_{ml} H^*_{mj,m}$$

$$INT_{IC,mj} = E\left[ \left( \sum_{i=1}^{K} H_{mj,\overline{m}} V_{\overline{m}l} x_{\overline{m}l} \right) \left( \sum_{l=1}^{K} H_{mj,\overline{m}} V_{\overline{m}l} x_{\overline{m}l} \right)^* \right] =$$

$$\frac{P}{K\beta} H_{mj,\overline{m}} \sum_{i=1}^{K} V_{\overline{m}l} V^*_{\overline{m}l} H^*_{mj,\overline{m}}$$

$SIG_{mj,i}$ denotes signal covariance matrix at user mj (when $V_{mi}$ is used for the transmission), $INT_{IU,mj,K \backslash i}$ denotes the inter user interference covariance matrix at user mj (when $V_{mi}$ is used for the transmission), and $INT_{IC,mj}$ indicates out-of-cell interference covariance matrix at user mj. Then, the achievable rate at user mj after post processing with a post processing matrix $W_{mj,i} \in C^{N \times \beta}$ (with $W^*_{mj,i} W_{mj,i} = I_\beta$) can be determined as shown in Equation (4).

$$R_{mj,i} = E \log_2 \left( \frac{|I_\beta + w^*_{mj,i}(SIG_{mj,i} + INT_{IU,mj,K \backslash i} + INT_{IC,mj}) W_{mj,i}|}{|I_\beta + w^*_{mj,i}(INT_{IU,mj,K \backslash i} + INT_{IC,mj}) W_{mj,i}|} \right) \quad (4)$$

In Equation (4), the post processing matrix $W_{mj,i}$ can be determined by minimizing the interference terms $INT_{IU,mj,i} + INT_{IC,mj,i}$ or by maximizing the achievable rate. We first elaborate how we can conveniently choose CQI when $W_{mj,i}$ is designed to mitigate $INT_{IU,mj,i} + INT_{IC,mj,i}$. Then, we address the case when $W_{mj,i}$ is determined to maximize $R_{mj,i}$.

2.1 Minimum Interference (Inter-user Interference+Out-of-cell Interference) User Scheduling In this case, the post processing matrix is determined to mitigate $INT_{IU,mj,i} + INT_{IC,mj,i}$. Without loss of generality, we define the rate achievable with infinite number of users scheduling (J=∞) as $R_{mj,i}^\infty = E \log_2(|I_\beta + \tilde{W}^*_{mj,i} SIG_{m\pi_k} \tilde{W}_{mj,i}|)$.

$$R_{mj,i}^{\infty} - R_{mj,i} = E\log_2(|I_\beta + \tilde{W}_{mj,i}^* SIG_{m\tilde{\pi}_k}\tilde{W}_{mj,i}|) - \quad (5)$$

$$E\log_2\left(\frac{|I_\beta + W_{mj,i}^*(SIG_{mj,i} + INT_{IU,mj,K\backslash i} + INT_{IC,mj})W_{mj,i}|}{|I_\beta + W_{mj,i}^*(INT_{IU,mj,K\backslash i} + INT_{IC,mj})W_{mj,i}|}\right) \le$$

$$E\log_2(|I_\beta + W_{mj,i}^*(INT_{IU,mj,K\backslash i} + INT_{IC,mj})W_{mj,i}|) =$$

$$E\,tr(\log_2(I_\beta + W_{mj,i}^*(INT_{IU,mj,K\backslash i} + INT_{IC,mj})W_{mj,i})) \le$$

$$E\,tr(W_{mj,i}^*(INT_{IU,mj,K\backslash i} + INTT_{IC,mj})W_{mj,i})$$

From Equation (5), the CQI at user mj when $V_{mi}$ is used for the transmission can be determined as shown in Equation (6).

$$\alpha_{mj,i} = \min_{\tilde{w}_{mj,i}} tr(\hat{W}_{mj,i}^*(INT_{IU,mj,K\backslash i} + INT_{IC,mj})\hat{W}_{mj,i}) \quad (6)$$

Let the eigenvalue decomposition $INT_{IU,mj,K\backslash i} + INT_{IC,mj} = U_{mj}\Sigma_{mj}U^*_{mj}$. Then, the optimal filter weight $W_{mj,i}$ that minimizes $tr(W_{mj,i}^*(INT_{IU,mj,K\backslash i} + INT_{IC,mj})W_{mj,i})$ is determined by $W_{mj,i} = [u_{mj,N-\beta+1} \ldots u_{mj,N}]$ where $u_{mj,i}$ denotes the ith column of $U_{mj}$.

Given CQI defined in Equation (6), user mj feeds back $\{\alpha_{mj,i}\}_{i\in K}$, i.e., user mj evaluates interference (inter-user interference+out-of-cell interference) powers corresponding to each of K beam forming vectors. Then, receiver m determines the best K user set $\Pi = \{\pi_1, \ldots, \pi_K\} \subset j$ to minimize the sum interference as shown in Equation (7).

$$\Pi = \{\pi_1, \ldots, \pi_K\} = \operatorname{argmin}_{\tilde{\Pi} = \{\tilde{\pi}_1, \ldots, \tilde{\pi}_K\} \subset j} \Sigma_{i=1}^K \alpha_{m\tilde{\pi}_i,i} \quad (7)$$

In Equation (4), $\tilde{\Pi} = \{\tilde{\pi}_1, \ldots, \tilde{\pi}_K\}$ with $\tilde{\pi}_1 \ne \tilde{\pi}_2 \ne \ldots \ne \tilde{\pi}_K$ denotes the all the possible K user permutation in J. Hence, finding the optimal user set $\Pi = \{\pi_1, \ldots, \pi_K\}$ requires total $$\binom{J}{K}K! = \frac{J!}{(J-K)!}$$

times of computations of $\Sigma_{i=1}^K \alpha_{m\tilde{\pi}_i}$.

2.2 Maximum Sumrate User Scheduling

In this case, the post processing matrix is determined to maximize $R_{mj,i}$ in Equation (4). For simplicity, denote $INT_{mj,i} = INT_{IU,mj,K\backslash i} + INT_{IC,mj}$.

Then, $R_{mj,i}$ in Equation (4) is lower bounded by Equation (8).

$$R_{mj,i} = E\log_2\left(\frac{|I_\beta | W_{mj,i}^*(SIG_{mj,i} | INT_{mj,i})W_{mj,i}|}{|I_\beta + W_{mj,i}^*(INT_{mj,i})W_{mj,i}|}\right) \ge \quad (8)$$

$$E\log_2\left(\frac{|W_{mi,i}^*(SIG_{mj,i})W_{mj,i}|}{|I_\beta + W_{mj,i}^*(INT_{mj,i})W_{mj,i}|}\right)\ldots.$$

The optimal $W_{mj,i}$ that maximize the lower bound of Equation (8) is found as follows.

With a congruence transformation, there exists $X_{mj} \in C^{N \times N}$ such that:

$$X^*hd\,mjSIG_{mj,i}X_{mj} = \operatorname{diag}(c_1, \ldots, c_N) = C_d \quad (9)$$

where $c_1 \ge c_2 \ge \ldots \ge c_N \ge 0$, and $$X^*_{mj}(I_N + INT_{mj,i})X_{mj} = \operatorname{diag}(s_1, \ldots, s_N) = S_d \quad (10)$$

where $s_N \ge s_{N-1} \ge \ldots \ge s_1 > 0$. Then, from Equation (9) and Equation (10), $X^*_{mj}SIG_{mj,i}X_{mj}C_d^{-1} = X^*_{mj}(I_N + INT_{mj,i})X_{mj}S_d^{-1} \Rightarrow SIG_{mj,i}X_{mj} = (I_N + INT_{mj,i})X_{mj}S_d^{-1}C_d$ Implying $$SIG_{mj,i}x_{mi,1} = \frac{c_1}{s_1}(I_N + INT_{mj,i})x_{mj,1} = \lambda_l(I_N + INT_{mj,i})x_{mj,1},$$

where $x_{mj,l}$ denotes the lth column of $X_{mj}$ for $l = 1, 2, \ldots, N$. Thus, $$\lambda_l = \frac{c_l}{s_l}$$

is the generalized eigenvalue of $SIG_{mj,i}$ and $(I_N + INT_{mj,i})$ such that $\lambda_1 \ge \lambda_2 \ge \ldots \ge \lambda_N$.

Hence, $$\frac{|W_{mj,i}^*(SIG_{mj,i})W_{mj,i}|}{|I_\beta + W_{mj,i}^*(INT_{mj,i})W_{mj,i}|} \le \prod_{i=1}^{\beta} \lambda_i.$$

The equality is achieved by choosing the first $\beta$ generalized eigenvectors associated with the generalized eigenvalues $\lambda_1, \lambda_2, \ldots, \lambda_\beta$, as shown in Equation (11).

$$W_{mj,i} = [x_{mj,1}\,x_{mj,2}\ldots x_{mj,\beta}] \quad (11)$$

Now, given $W_{mj,i}$ in Equation (11), CQI is defined as $$\alpha_{mj,i} = \log_2\left(\frac{|W_{mj,i}^*(SIG_{mj,i})W_{mj,i}|}{|I_\beta | W_{mj,i}^*(INT_{mj,i})W_{mj,i}|}\right).$$

User mj feeds back $\{\alpha_{mj,i}\}_{i \in K}$ to receiver m and the receiver m determines the best K user's index set $\Pi = \{\pi_1, \ldots, \pi_K\}$ to maximize the sum rate such that $\Pi = \{\pi_1, \ldots, \pi_K\} = \operatorname{argmax}$ $$\tilde{\Pi} = \{\tilde{\pi}_1, \ldots, \tilde{\pi}_K\} \subset J \sum_{i=1}^K \alpha_{m\tilde{\pi}_i,i},$$

where $\tilde{\pi}_1 \ne \tilde{\pi}_2 \ne \ldots \ne \tilde{\pi}_K$.

3. Opportunistic Interference Alignment

The exhaustive use scheduling in Section 3 requires $$\frac{J!}{(J-K)!}$$

times of calculation for finding the best user ordering. In this section, we develop a low complex user scheduling scheme which is based on ordering users in the interference alignment planes $\{P_m\}_{m \in \{1,2\}}$ where $P_m \in C^{M \times N}$ and $P^*_m P_m = I_N$. Now, we rewrite Equation (3) as Equation (12).

$$Y_{mj} = H_{mj,m}P_m s_m + H_{mj,\bar{m}}P_{\bar{m}} s_{\bar{m}} + z_{mj} \quad (12)$$

In Equation (12), $$s_m = \sum_{i=1}^K V_{mi} x_{mi}.$$

The $V_{mi}$ satisfies $V_{mi} \in C^{N \times \beta}$ and $tr(V^*_{mi} V_{mi}) = \beta$. We have the same equality power constraints $tr(E[s_m s^*_m]) = P$ and $$E[x_{mi} x^*_{mi}] = \frac{P}{K\beta}$$

as in Section 3. In this approach, contrary to Section 3, the interference alignment plains $\{P_m\}_{m \in \{1,2\}}$ are not used for data transmission, but used for scheduling users. Once the users have been opportunistically scheduled, the transmitter performs zero-forcing by designing $\{V_{mi}\}_{i \in K}$.

The CQI consists of one $\alpha_{mj}$ and one $F_{mj} \in C^{\beta \times N}$. Analogous to Section 3, for scheduling the users, the post processing matrix $W_{mj} \in C^{N \times \beta}$ (with $W^*_{mj} W_{mj} = I_\beta$) can be determined by minimize the out-of-cell interference or to maximize the achievable rate.

Define:
$SIG_{mj} = E[(H_{mj,m} P_m s_m)(H_{mj,m} P_m s_m)^*] = P \quad H_{mj,m} P_m P^*_m H^*_{mj,m}$ and
$INT_{IC,mj} = E[(H_{mj,\bar{m}} P_{\bar{m}} s_{\bar{m}})(H_{mj,\bar{m}} P_{\bar{m}} s_{\bar{m}})^*] = P \quad H_{mj,\bar{m}} P_{\bar{m}} P^*_{\bar{m}} H^*_{mj,\bar{m}}$, where $SIG_{mj}$ denotes the signal covariance matrix at user mj and $INT_{IC,mj}$ denotes the out-of-cell interference covariance matrix at user mj. Then, the mutual information after post processing between $s_m$ and $W^*_{mj} Y_{mj}$ can be expressed as shown in Equation (13)

$$I_{mj} = \log_2 \left( \frac{|I_\beta + W^*_{mj}(SIG_{mj} + INT_{IC,mj}) W_{mj}|}{|I_\beta + W^*_{mj}(INT_{IC,mj}) W_{mj}|} \right) \ldots \quad (13)$$

3.1 Minimum Out-of-cell Interference User Scheduling

Define CQI at user mj as shown in Equation (14).

$$\alpha_{mj} = \min_{\hat{W}_{mj}} tr(\hat{W}^*_{mj}(INT_{IC,mj}) \hat{W}_{mj}) \quad (14)$$

Let the eigenvalue decomposition $INT_{IC,mj} = U_{mj} \Sigma_{mj} U^*_{mj}$. Then, the optimal filter weights $W_{mj}$ that minimizes $tr(\hat{W}^*_{mj}(INT_{IC,mj}) \hat{W}_{mj})$ is determined by $W_{mj} = [u_{mj,N-\beta+1} \ldots u_{mj,N}]$ where $u_{mj,i}$ denotes the ith column of $U_{mj}$.

Given CQI defined in Equation (4), user mj feeds back one $\alpha_{mj}$ and a matrix $F_{mj} \in C^{\beta \times N}$. The $F_{mj}$ is defined as the direction of the post processed channel matrix $W^*_{mj} H_{mj,m} P_m$ where the direction of $W^*_{mj} H_{mj,m} P_m$ can be extracted by SVD $W^*_{mj} H_{mj,m} P_m = U_{mj} R_{mj} V^*_{mj}$ as $F_{mj} = [v_{mj,1} \ldots v_{mj,\beta}]^*$. Note that we can employ matrix codebook or elementwise quantization for delivering $F_{mj}$ to the base station m.

Then, receiver m determines K user set $\Pi = \{\pi_1, \ldots, \pi_K\}$ to minimize the sum out-of-cell interference such that $$\Pi = \{\pi_1, \ldots, \pi_K\} = \operatorname{argmin}_{\tilde{\Pi} = \{\tilde{\pi}_1, \ldots, \tilde{\pi}_K\} \subset J} \sum_{i=1}^{K} \alpha_{m\tilde{\pi}_i},$$

where $\tilde{\Pi} = \{\tilde{\pi}_1, \ldots, \tilde{\pi}_K\}$ with $\tilde{\pi}_1 \neq \tilde{\pi}_2 \neq \ldots \neq \tilde{\pi}_K$ denotes the all possible K user combinations in J. Hence, finding the optimal user set $\Pi = \{\pi_1, \ldots, \pi_K\}$ requires total $$\binom{J}{K} = \frac{J!}{K!(J-K)!}$$

times of computation for $\Sigma_{i=1}^{K} \alpha_{m\tilde{\pi}_i}$. The complexity for finding $\Pi = \{\pi_1, \ldots, \pi_K\}$ can be decreased if we use an efficient sorting algorithms for sorting all $\{\alpha_{mj}\}_{j \in J}$ such that $\{\alpha_{m\pi_1}, \ldots, \alpha_{m\pi_K}\} \leq \{\alpha_{mj}\}_{j \in J \setminus \Pi}$.

This easily accomplished by using fast sorting algorithms which usually requires on average $J \log_2(J)$ comparisons. If we consider one addition is equivalent to one comparison, for choosing the user the exhaustive search in Section 3 requires total $$\frac{J!}{(J-K)!} K$$

times of additions while the opportunistic interference alignment requires only $J \log_2(J)$ times of comparisons.

After selecting the users $\Pi = \{\pi_1, \ldots, \pi_K\}$ the transmitter determines the transmit filter weight as zero-forcing weight. Consider a stacked matrix $$F_{m\Pi} = \begin{bmatrix} F_{m\pi_1} \\ F_{m\pi_2} \\ \vdots \\ F_{m\pi_K} \end{bmatrix}$$

and the inverse of $F_{m\Pi}$ as $F_{m\Pi}^{-1} = \tilde{V}_{m\Pi}$. To meet the power constraint each column of $\tilde{V}_{m\Pi}$ is normalized as one and we denote the normalized one as $V_{m\Pi}$. Then, the zero-forcing transmit vectors $\{V_{m\pi_i}\}_{i \in \Pi}$ for users $\{m\pi_i\}_{i \in \Pi}$ are mapped by $V_{m\Pi} = [V_{m\pi_1} V_{m\pi_2} \ldots V_{m\pi_K}]$.

3.2 Maximizing Sumrate User Scheduling

The $I_{mj}$ in Equation (13) is lower bounded as shown in Equation (15).

$$I_{mj} = \log_2 \left( \frac{|I_\beta + w^*_{mj}(SIG_{mj} + INT_{IC,mj}) w_{mj}|}{|I_\beta + w^*_{mj}(INT_{IC,mj}) w_{mj}|} \right) \geq \quad (15)$$

$$E \log_2 \left( \frac{|W^*_{mj}(SIG_{mj}) W_{mj}|}{|I_\beta + W^*_{mj}(INT_{IC,mi}) W_{mj}|} \right) \ldots$$

The optimal $W_{mj}$ that maximize the lower bound of Equation (15) is the first $\beta$ generalized eigenvectors of $(SIG_{mj}, I_N + INT_{IC,mj})$. Analogous with Section 3.2, we define the generalized eigenvalue matrix of $(SIG_{mj}, I_N + INT_{IC,mj})$ as $X_{mj}$ where the ith columns of $X_{mj}$ corresponds to ith dominant eigenvalue $\lambda_i$. Hence, the bound of Equation (15) is maximized by selecting $W_{mj}$ as below shown in Equation (16).

$$W_{mj} = [x_{mj,1} x_{mj,2} \ldots x_{mj,\beta}] \quad (16)$$

Now, given $W_{mj}$ in Equation (11), we define the CQI as $$\alpha_{mj} = \log_2 \left( \frac{|W^*_{mj}(SIG_{mj}) W_{mj}|}{|I_\beta| W^*_{mj}(INT_{IC,mi}) W_{mj}|} \right).$$

User mj feeds back one $\alpha_{mj}$ and a matrix $F_{mj} \in C^{\beta \times N}$ to receiver m and the receiver m determines the best K user's index set $\Pi=\{\pi_1,\ldots,\pi_K\}$ to maximize the sum rate such that $$\Pi = \{\pi_1,\ldots,\pi_K\} = \operatorname{argmax}_{\Pi=\{\tilde{\pi}_1,\ldots,\tilde{\pi}_K\} \subset J} \sum_{i=1}^{K} \alpha_{m\tilde{\pi}_i},$$

where $\tilde{\pi}_1 \neq \tilde{\pi}_2 \neq \ldots \neq \tilde{\pi}_K$.

After selecting the users $\Pi=\{\pi_1,\ldots,\pi_K\}$ the transmitter determines the transmit filter weight as zero-forcing weight. Consider a stacked matrix:

$$F_{m\Pi} = \begin{bmatrix} F_{m\pi_1} \\ F_{m\pi_2} \\ \vdots \\ F_{m\pi_K} \end{bmatrix},$$

and the inverse of $F_{m\Pi}$ as $F_{m\Pi}^{-1}=\tilde{V}_{m\Pi}$. To meet the power constraint each column of $\tilde{V}_{m\Pi}$ is normalized as one and we denote the normalized one as $V_{m\Pi}$. Then, the zero-forcing transmit vectors $\{V_{m\pi_i}\}_{i\in\Pi}$ for users $\{m\pi_i\}_{i\in\Pi}$ are mapped by $V_{m\Pi}=[V_{m\pi_1} V_{m\pi_2} \ldots V_{m\pi_K}]$.

In this section, we evaluate the proposed user scheduling schemes where the transmitter serves the best K=2 users among J users. The numbers of the transmit antennas and receive antennas are given by $M=K\beta+\beta$ and $N=K\beta$. Throughout the simulation we assume single date stream transmission per user, we use MIUS to denote the minimum interference user scheduling (MIUS) presented in Section 2.1 and 3.1, and MSUS is used to denote the maximum sumrate user scheduling (MSUS) in Section 2.2 and 3.2.

Figure 3:
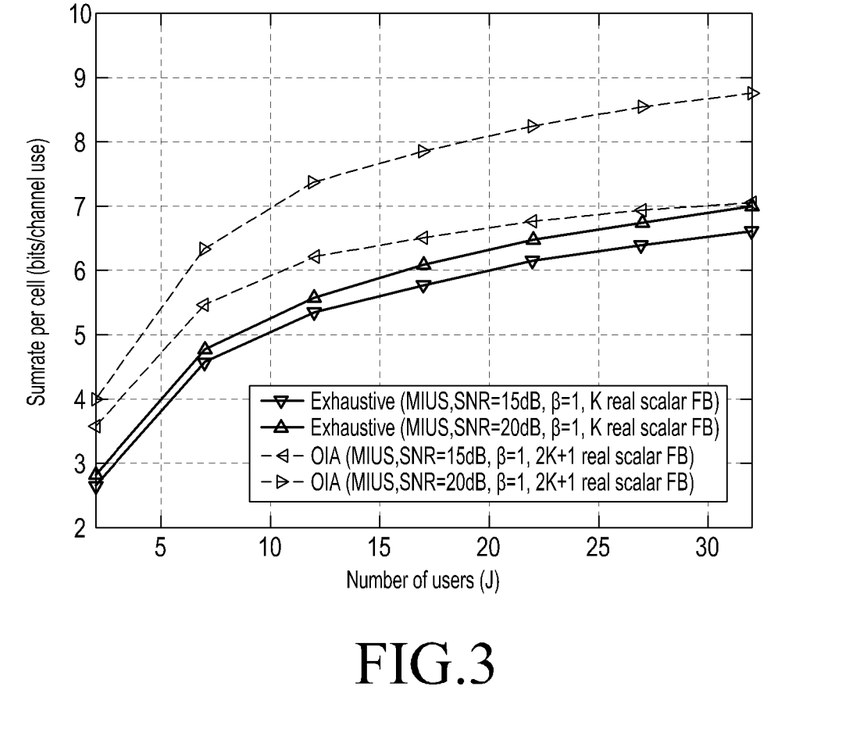
FIG. 3 illustrates sumrates per cell for MIUS schemes.

FIG. 3 Illustrates sumrates per cell for MIUS schemes.

Referring to FIG. 3, 'Exhaustive' implies exhaustive user scheduling scheduling scheme in Section 2 and 'OIA' denotes the opportunistic interference alignment scheme in Section 3. Exhaustive user searching only needs to feedback K real CQI values $\{\alpha_{mj,i}\}_{i\in K}$ and OIA requires to send back one real CQI $\alpha_{mj}$ and the direction of the post processed channel matrix $F_{mj}\in C^{1\times K}$ which is composed of 2K real values. The exhaustive user scheduler at the receiver need to compute $$\frac{J!}{(J-K)!}K$$

folds of computation, while the OIA only needs to compute $J \log_2(J)$ folds of operations. As can be seen from FIG. 3, OIA shows better performance. As SNR increases the throughput enhancement for OIA is significant compared to exhaustive user selection.

Figure 4:
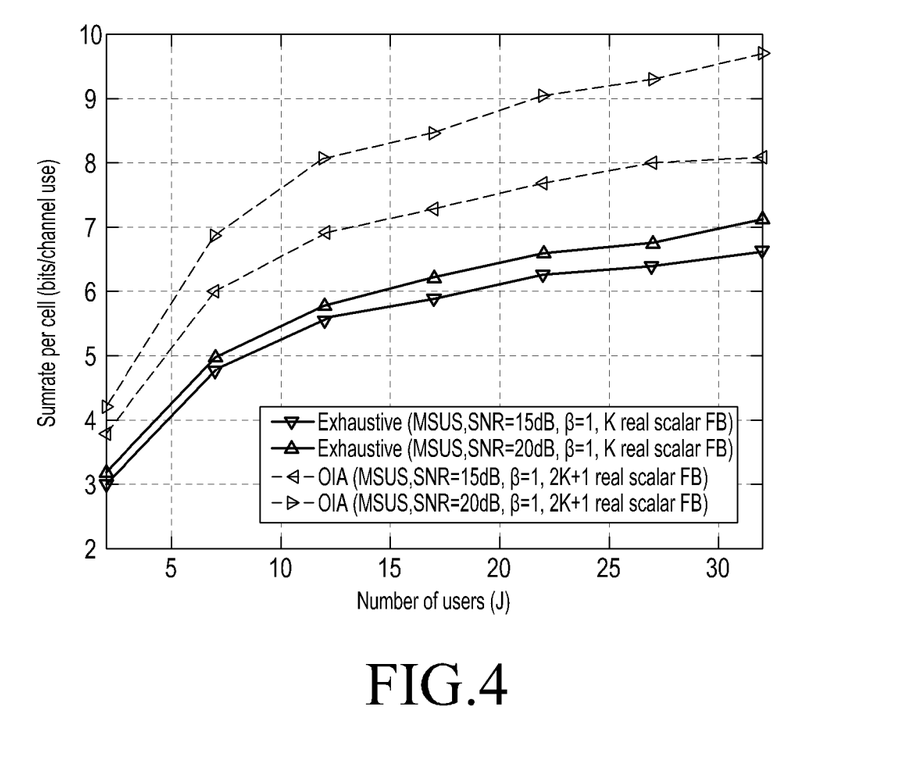
FIG. 4 illustrates sumrate performance for MSUS schemes.

FIG. 4 Illustrates sumrate performance for MSUS schemes.

Referring to FIG. 4, Compared to MIUS, MSUS yields higher throughput gain because the post processing matrix is chosen to maximize the individual throughput. The similar trend is observed as FIG. 3. However, compared to FIG. 3, the optimality of the post processing matrix design in MSUS promises the significant throughput gain especially for OIA.

In FIG. 3 and FIG. 4, we consider the feedback scenario where each user in OIA feeds back 2K+1 real scalars. In this simulation study, we investigate the effect of the quantization error when we employ the matrix codebook to quantize the post processed channel $F_{mj}\in C^{1\times K}$.

Figure 5:
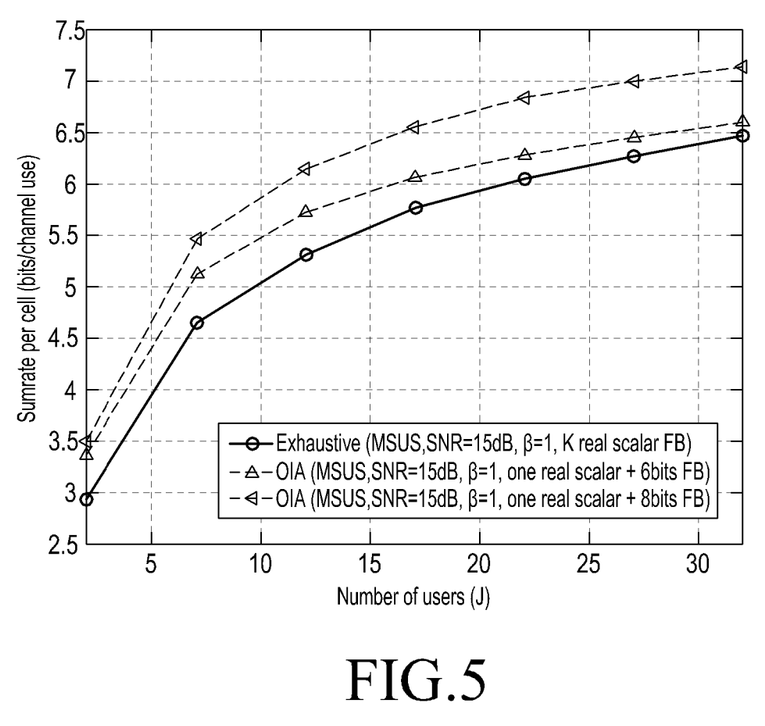
FIG. 5 illustrates sumrate performance for MSUS employing 6bits and 8bits of matrix codebook.

FIG. 5 illustrates the sumrate performance for MSUS when we employ 6bits and 8bits of matrix codebook. For the sake of the simplicity the codebook is randomly generated.

As can be seen from the FIG. 5, OIA can achieve better performance than exhaustive user searching at high SNR with reduced feedback amount.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for opportunistic user scheduling of a multi-user multiple input multiple output (MIMO) by a base station, the method comprising:

broadcasting signals through a set of randomly generated beamforming vectors;

receiving channel quality information (CQI) from each of user terminals that receive the broadcasted signals; and determining a best user set among the user terminals based on the CQI and inter-user interference of the user terminals, wherein a number of beamforming vectors included in the set of randomly generated beamforming vectors is equal to a number of user terminals included in the best user set, wherein the CQI comprises CQI values corresponding to the beamforming vectors, respectively, wherein each of the CQI values corresponding to the beamforming vectors is determined based on a post processing matrix to be applied to the broadcasted signals, and an inter-user interference and an out-of-cell interference when a corresponding beamforming vector is used for transmission, wherein the post processing matrix for the corresponding beamforming vector is determined to maximize an achievable rate after post processing with the post processing matrix to be applied to the broadcasted signals when the corresponding beamforming vector is used for transmission, and wherein the achievable rate after post processing is calculated based on a signal when the corresponding beamforming vector is used for transmission, the inter-user interference and the out-of-cell interference when the corresponding beamforming vector is used for transmission.

2. The method of claim 1, wherein the best user set is determined to minimize sum interference in each of at least two cells.

3. The method of claim 2, wherein the sum interference is calculated by adding the inter-user interference to out-of-cell interference.

4. The method of claim 1, wherein the best user set is determined to maximize sum rate in each of at least two cells.

5. The method of claim 1, wherein the best user set is determined to minimize sum out-of-cell interference in each of at least two cells.

6. A method for opportunistic user scheduling of a multi-user multiple input multiple output (MIMO) by a user terminal, the method comprising:

receiving a signal broadcasted from a base station through a set of randomly generated beamforming vectors;

determining channel quality information (CQI) based on the received signal; and transmitting the CQI to the base station, wherein a best user set is determined based on CQI of each of user terminals including the user terminal and the other user terminals and inter-user interference of the user terminals, and wherein the CQI comprises CQI value corresponding to the beamforming vectors, respectively wherein a number of beamforming vectors included in the set of randomly generated beamforming vectors is equal to a number of user terminals included in the best user set, wherein the CQI comprises CQI values corresponding to the beamforming vectors respectively, wherein each of the CQI values corresponding to the beamforming vectors is determined based on a post processing matrix to be applied to the broadcasted signals, and an inter-user interference and an out-of-cell interference when a corresponding beamforming vector is used for transmission.

wherein the post processing matrix for the corresponding beamforming vector is determined to maximize an achievable rate after post processing with the post processing matrix to be applied to the broadcasted signals when the corresponding beamforming vector is used for transmission, and wherein the achievable rate after post processing is calculated based on a signal when the corresponding beamforming vector is used for transmission, the inter-user interference and the out-of-cell interference when the corresponding beamforming vector is used for transmission.

7. The method of claim 6, wherein the best user set is determined to minimize sum interference in each of at least two cells.

8. The method of claim 7, wherein the sum interference is calculated by adding the inter-user interference to out-of-cell interference.

9. The method of claim 6, wherein the best user set is determined to maximize sum rate in each of at least two cells.

10. The method of claim 6, wherein the best user set is determined to minimize sum out-of-cell interference in each of at least two cells.

11. An apparatus for opportunistic user scheduling of multi-user multiple input multiple output (MIMO), the apparatus comprising:

a communication module configured to broadcast signals through a set of randomly generated beamforming vectors, and to receive channel quality information (CQI) from each of user terminals that receive the broadcasted signals, and a controller configured to determine a best user set among the user terminals based on the CQI and inter-user interference of the user terminals, wherein a number of beamforming vectors included in the set of randomly generated beamforming vectors is equal to a number of user terminals included in the best user set, wherein the CQI comprises CQI values corresponding to the beamforming vectors, respectively, wherein each of the CQI values corresponding to the beamforming vectors is determined based on a post processing matrix to be applied to the broadcasted signals, and an inter-user interference and an out-of-cell interference when a corresponding beamforming vector is used for transmission, wherein the post processing matrix for the corresponding beamforming vector is determined to maximize an achievable rate after post processing with the post processing matrix to be applied to the broadcasted signals when the corresponding beamforming vector is used for transmission, and wherein the achievable rate after post processing is calculated based on a signal when the corresponding beamforming vector is used for transmission, the inter-user interference and the out-of-cell interference when the corresponding beamforming vector is used for transmission.

12. The apparatus of claim 11, wherein the best user set is determined to minimize sum interference in each of at least two cells.

13. The apparatus of claim 12, wherein the sum interference is calculated by adding the inter-user interference to out-of-cell interference.

14. The apparatus of claim 11, wherein the best user set is determined to maximize sum rate in each of at least two cells.

15. The apparatus of claim 11, wherein the best user set is determined to minimize sum out-of-cell interference in each of at least two cells.

16. A user terminal for opportunistic user scheduling of multi-user multiple input multiple output (MIMO), the user terminal comprising:

a communication module configured to receive a signal broadcasted from a base station through a set of randomly generated beamforming vectors, and to transmit channel quality information (CQI) to the base station; and a controller configured to determine the CQI based on the received signal, wherein a best user set is determined based on CQI of each of user terminals including the user terminal and the other user terminals and inter-user interference of the user terminals, wherein a number of beamforming vectors included in the set of randomly generated beamforming vectors is equal to a number of user terminals included in the best user set, wherein the CQI comprises CQI values corresponding to the beamforming vectors, respectively, wherein each of the CQI values corresponding to the beamforming vectors is determined based on a post processing matrix to be applied to the broadcasted signals, and an inter-user interference and an out-of-cell interference when a corresponding beamforming vector is used for transmission, wherein the post processing matrix for the corresponding beamforming vector is determined to maximize an achievable rate after post processing with the post processing matrix to be applied to the broadcasted signals when the corresponding beamforming vector is used for transmission, and wherein the achievable rate after post processing is calculated based on a signal when the corresponding beamforming vector is used for transmission, the inter-user interference and the out-of-cell interference when the corresponding beamforming vector is used for transmission.

17. The user terminal of claim 16, wherein the best user set is determined to minimize sum interference in each of at least two cells.

18. The user terminal of claim 17, wherein the sum interference is calculated by adding the inter-user interference to out-of-cell interference.

19. The user terminal of claim 16, wherein the best user set is determined to maximize sum rate in each of at least two cells.

20. The user terminal of claim 16, wherein the best user set is determined to minimize sum out-of-cell interference in each of at least two cells.

* * * * *